US012183964B2

(12) United States Patent

Chang et al.

(10) Patent No.: US 12,183,964 B2

(45) Date of Patent: Dec. 31, 2024

(54) MOBILE DEVICE WITH HIGH RADIATION EFFICIENCY

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 148 days.

(21) Appl. No.: 17/934,606

(22) Filed: Sep. 23, 2022

(65) Prior Publication Data

US 2023/0387570 A1 Nov. 30, 2023

(30) Foreign Application Priority Data

May 25, 2022 (TW) ................................. 111119403

(51) Int. Cl.

*H01Q 1/22* (2006.01)
*H01Q 1/48* (2006.01)
*H01Q 5/307* (2015.01)

(52) U.S. Cl.

CPC ............. *H01Q 1/2266* (2013.01); *H01Q 1/22* (2013.01); *H01Q 1/48* (2013.01); *H01Q 5/307* (2015.01)

(58) Field of Classification Search

CPC ........ H01Q 1/2266; H01Q 1/48; H01Q 5/307; H01Q 5/385; H01Q 9/42; H01Q 1/22

See application file for complete search history.

(56) References Cited

U.S. PATENT DOCUMENTS

| | | | | |
|---|---|---|---|---|
| 6,166,694 A * | 12/2000 | Ying | .................... | H01Q 9/0421 343/702 |
| 10,389,007 B1 * | 8/2019 | Choi | ...................... | H01Q 21/08 |
| 10,454,156 B1 * | 10/2019 | Yang | ........................ | H01Q 1/48 |
| 10,490,902 B2 * | 11/2019 | Yen | ........................ | H01Q 13/10 |
| 2004/0108957 A1 * | 6/2004 | Umehara | ............... | H01Q 5/385 343/702 |

(Continued)

FOREIGN PATENT DOCUMENTS

| | | | |
|---|---|---|---|
| KR | 20080034646 A * | 10/2006 | ............... G06F 1/00 |
| TW | 201728006 A | 8/2017 | |
| TW | 202121749 A | 6/2021 | |

OTHER PUBLICATIONS

Chinese language office action dated Nov. 15, 2022, issued in application No. TW 111119403.

*Primary Examiner* — Hai V Tran

(74) *Attorney, Agent, or Firm* — McClure, Qualey & Rodack, LLP

(57) ABSTRACT

A mobile device with high radiation efficiency includes a ground element, a first radiation element, a second radiation element, a third radiation element, a fourth radiation element, and a dielectric substrate. The first radiation element has a feeding point. The second radiation element is coupled to the first radiation element. The first radiation element is coupled through the third radiation element to the ground element. The fourth radiation element is coupled between the first radiation element and the third radiation element. The first radiation element, the second radiation element, the third radiation element, and the fourth radiation element are disposed on the dielectric substrate. An antenna structure is formed by the first radiation element, the second radiation element, the third radiation element, and the fourth radiation element.

13 Claims, 4 Drawing Sheets

(56) References Cited

U.S. PATENT DOCUMENTS

| | | | | |
|---|---|---|---|---|
| 2005/0168384 | A1* | 8/2005 | Wang | H01Q 9/42 343/702 |
| 2009/0079639 | A1* | 3/2009 | Hotta | H01Q 5/378 343/702 |
| 2009/0295652 | A1* | 12/2009 | Yagi | H01Q 9/40 343/702 |
| 2012/0044155 | A1* | 2/2012 | Nakada | G06F 1/1675 345/173 |
| 2012/0242555 | A1* | 9/2012 | Hsieh | H01Q 5/378 343/860 |
| 2012/0274538 | A1* | 11/2012 | Tsou | H01Q 5/371 343/876 |
| 2013/0207861 | A1* | 8/2013 | Huang | H01Q 1/2266 343/700 MS |
| 2013/0257660 | A1* | 10/2013 | Wong | H01Q 5/371 343/702 |
| 2015/0236422 | A1* | 8/2015 | You | H01Q 9/42 343/729 |
| 2015/0288074 | A1* | 10/2015 | Harper | H01Q 9/42 343/833 |
| 2015/0295314 | A1* | 10/2015 | Oh | H01Q 5/378 343/866 |
| 2016/0128439 | A1* | 5/2016 | Senatori | G06F 1/1616 206/45.2 |
| 2016/0156102 | A1* | 6/2016 | Azad | H01Q 9/42 343/905 |
| 2018/0351254 | A1* | 12/2018 | Yen | H01Q 13/10 |
| 2019/0198975 | A1* | 6/2019 | Chen | H01Q 9/42 |
| 2020/0014092 | A1* | 1/2020 | Wei | H04M 1/0283 |
| 2020/0076049 | A1* | 3/2020 | Chang | H01Q 5/378 |
| 2020/0076061 | A1* | 3/2020 | Chen | H01Q 21/0068 |
| 2020/0185813 | A1* | 6/2020 | Chang | H01Q 1/48 |
| 2020/0295445 | A1* | 9/2020 | Tseng | H01Q 5/378 |
| 2020/0350671 | A1* | 11/2020 | Kang | H01Q 1/243 |
| 2021/0005952 | A1* | 1/2021 | Chang | H01Q 1/243 |
| 2021/0044000 | A1* | 2/2021 | Chang | H01Q 1/38 |
| 2021/0126343 | A1* | 4/2021 | Chang | H01Q 5/335 |
| 2021/0167499 | A1* | 6/2021 | Tseng | H01Q 5/385 |
| 2021/0175610 | A1* | 6/2021 | Ramasamy | H01Q 1/2266 |
| 2021/0328346 | A1* | 10/2021 | Zhang | H01Q 7/00 |
| 2022/0094060 | A1* | 3/2022 | Chang | H01Q 5/385 |
| 2022/0131267 | A1* | 4/2022 | Chen | H01Q 13/10 |
| 2022/0255226 | A1* | 8/2022 | Wang | H01Q 1/48 |
| 2023/0107295 | A1* | 4/2023 | Chang | H01Q 1/2266 343/720 |

* cited by examiner

200

MOBILE DEVICE WITH HIGH RADIATION EFFICIENCY

CROSS REFERENCE TO RELATED APPLICATIONS

This application claims priority of Taiwan Patent Application No. 111119403 filed on May 25, 2022, the entirety of which is incorporated by reference herein.

BACKGROUND OF THE INVENTION

Field of the Invention

The disclosure generally relates to a mobile device, and more particularly, it relates to a mobile device and its antenna structure with high radiation efficiency.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area, these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

In order to improve their appearance, today's designers often incorporate metal elements into mobile devices. However, these newly added metal elements tend to negatively affect the operation of antennas used for wireless communication in the mobile devices, thereby degrading the overall communication quality of the mobile devices. As a result, there is a need to propose a novel mobile device with a novel antenna structure, so as to overcome the problems of the prior art.

BRIEF SUMMARY OF THE INVENTION

In an exemplary embodiment, the disclosure is directed to a mobile device with high radiation efficiency. The mobile device includes a ground element, a first radiation element, a second radiation element, a third radiation element, a fourth radiation element, and a dielectric substrate. The first radiation element has a feeding point. The second radiation element is coupled to the first radiation element. The first radiation element is coupled through the third radiation element to the ground element. The fourth radiation element is coupled between the first radiation element and the third radiation element. The first radiation element, the second radiation element, the third radiation element, and the fourth radiation element are all disposed on the dielectric substrate. An antenna structure is formed by the first radiation element, the second radiation element, the third radiation element, and the fourth radiation element.

In some embodiments, the combination of the first radiation element and the third radiation element substantially has an inverted U-shape.

In some embodiments, the second radiation element substantially has a straight-line shape.

In some embodiments, the fourth radiation element substantially has a rectangular shape.

In some embodiments, the antenna structure covers a first frequency band and a second frequency band. The first frequency band is from 2400 MHz to 2500 MHz. The second frequency band is from 5150 MHz to 5850 MHz.

In some embodiments, the total length of the first radiation element and the second radiation element is substantially equal to 0.25 wavelength of the first frequency band or 0.5 wavelength of the second frequency band.

In some embodiments, the total length of the first radiation element and the third radiation element is substantially equal to 0.5 wavelength of the first frequency band.

In some embodiments, the length of the fourth radiation element is substantially equal to 0.5 wavelength of the second frequency band, and the width of the fourth radiation element is from 6 mm to 8 mm.

In some embodiments, the mobile device is a convertible notebook computer including an upper cover housing, a display frame, a keyboard frame, a base housing, and a support and rotating arm. The convertible notebook computer operates in different modes by using the support and rotating arm.

In some embodiments, the antenna structure is disposed on the support and rotating arm. When the convertible notebook computer operates in a tablet mode, the antenna structure is adjacent to a plurality of heat vents of the base housing.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
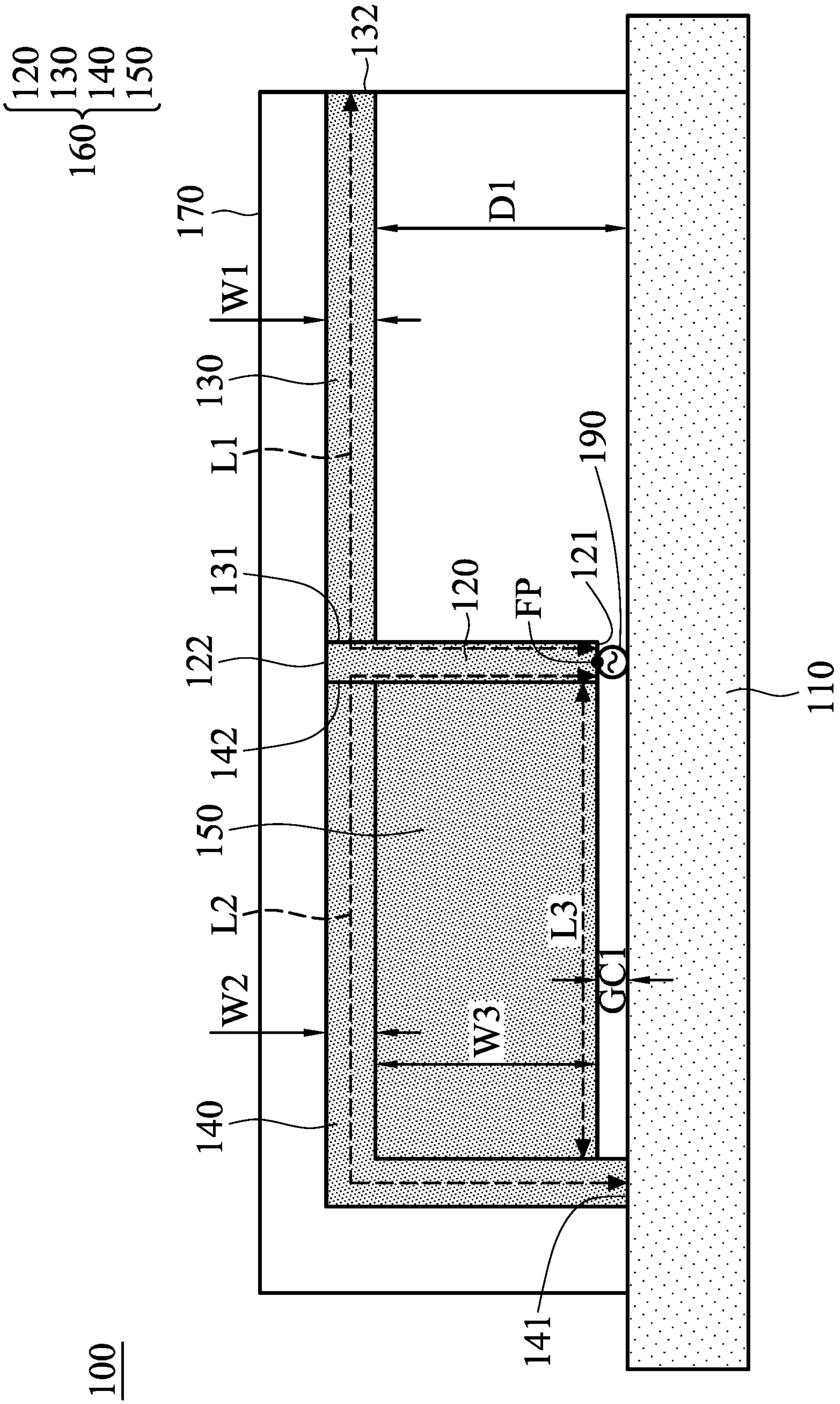
FIG. 1 is a top view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. For example, the mobile device 100 may be a smart phone, a tablet computer, or a notebook computer. In the embodiment of FIG. 1, the mobile device 100 includes a ground element 110, a first radiation element 120, a second radiation element 130, a third radiation element 140, a fourth radiation element 150, and a dielectric substrate 170. The ground element 110, the first radiation element 120, the second radiation element 130, the third radiation element 140, the fourth radiation element 150 may all be made of metal materials, such as copper, silver, aluminum, iron, or their alloys. It should be understood that the mobile device 100 may further include other components, such as a processor, a touch control panel, a speaker, a battery module, and a housing, although they are not displayed in FIG. 1.

The ground element 110 may be implemented with a ground copper foil, which can provide a ground voltage. For example, the ground element 110 may be coupled to a system ground plane (not shown) of the mobile device 100.

The first radiation element 120 may substantially have a straight-line shape. Specifically, the first radiation element 120 has a first end 121 and a second end 122. A feeding point FP is positioned at the first end 121 of the first radiation element 120. The feeding point FP may be further coupled to a signal source 190. For example, the signal source 190 may be an RF (Radio Frequency) module.

The second radiation element 130 may substantially have another straight-line shape, which may be substantially perpendicular to the first radiation element 120. Specifically, the second radiation element 130 has a first end 131 and a second end 132. The first end 131 of the second radiation element 130 is coupled to the second end 122 of the first radiation element 120. The second end 132 of the second radiation element 130 is an open end. In some embodiments, the length of the second radiation element 130 is longer than the length of the first radiation element 120.

The third radiation element 140 may substantially have an L-shape, which may be partially perpendicular and partially parallel to the first radiation element 120. For example, the first radiation element 120 may be positioned between the second radiation element 130 and the third radiation element 140. Specifically, the third radiation element 140 has a first end 141 and a second end 142. The first end 141 of the third radiation element 140 is coupled to the ground element 110. The second end 142 of the third radiation element 140 is coupled to the second end 122 of the first radiation element 120. Thus, the first radiation element 120 is coupled through the third radiation element 140 to the ground element 110. In some embodiments, the combination of the first radiation element 120 and the third radiation element 140 substantially has an inverted U-shape. In alternative embodiments, the length of the third radiation element 140 is longer than the length of the second radiation element 130.

The fourth radiation element 150 may have a rectangular shape or a square shape. Specifically, the fourth radiation element 150 is coupled between the first radiation element 120 and the third radiation element 140, and a notch of the aforementioned inverted U-shape is filled with the fourth radiation element 150. In some embodiments, a coupling gap GC1 is formed between the fourth radiation element 150 and the ground element 110.

The dielectric substrate 170 may be an FR4 (Flame Retardant 4) substrate, a PCB (Printed Circuit Board), or an FPC (Flexible Printed Circuit). The first radiation element 120, the second radiation element 130, the third radiation element 140, and the fourth radiation element 150 may all be disposed on the same surface of the dielectric substrate 170.

In a preferred embodiment, an antenna structure 160 of the mobile device 100 is formed by the first radiation element 120, the second radiation element 130, the third radiation element 140, and the fourth radiation element 150.

In some embodiments, the antenna structure 160 of the mobile device 100 can cover a first frequency band and a second frequency band. The first frequency band may be from 2400 MHz to 2500 MHz. The second frequency band may be from 5150 MHz to 5850 MHz. Therefore, the mobile device 100 can support at least the wideband operations of WLAN (Wireless Local Area Networks) 2.4 GHz/5 GHz.

In some embodiments, the operational principles of the antenna structure 160 of the mobile device 100 will be described as follows. The first radiation element 120 and the second radiation element 130 are excited to generate the first frequency band and the second frequency band as mentioned above. The first radiation element 120 and the third radiation element 140 are excited to generate an additional resonant mode, thereby increasing the bandwidth of the first frequency band. Furthermore, the fourth radiation element 150 is excited to generate another additional resonant mode, thereby increasing the bandwidth of the second frequency band.

In some embodiments, the element sizes of the mobile device 100 will be described as follows. The total length L1 of the first radiation element 120 and the second radiation element 130 may be substantially equal to 0.25 wavelength ($\lambda/4$) of the first frequency band of the antenna structure 160. Alternatively, the total length L1 of the first radiation element 120 and the second radiation element 130 may be substantially equal to 0.5 wavelength ($\lambda/2$) of the second frequency band of the antenna structure 160. The width W1 of the second radiation element 130 may be from 1 mm to 3 mm. The total length L2 of the first radiation element 120 and the third radiation element 140 may be substantially equal to 0.5 wavelength (λ/2) of the first frequency band of the antenna structure 160. The width W2 of the third radiation element 140 may be from 1 mm to 3 mm. The length L3 of the fourth radiation element 150 may be substantially equal to 0.5 wavelength (λ/2) of the second frequency band of the antenna structure 160. The width W3 of the fourth radiation element 150 may be from 6 mm to 8 mm. The width of the coupling gap GCI may be from 1 mm to 2 mm. The distance D1 between the second radiation element 130 and the ground element 110 may be from 7 mm to 13 mm. The above ranges of element sizes are calculated and obtained according to the results of many experiments, and they help to optimize the operational bandwidth and impedance matching of the antenna structure 160 of the mobile device 100.

Figure 2A:
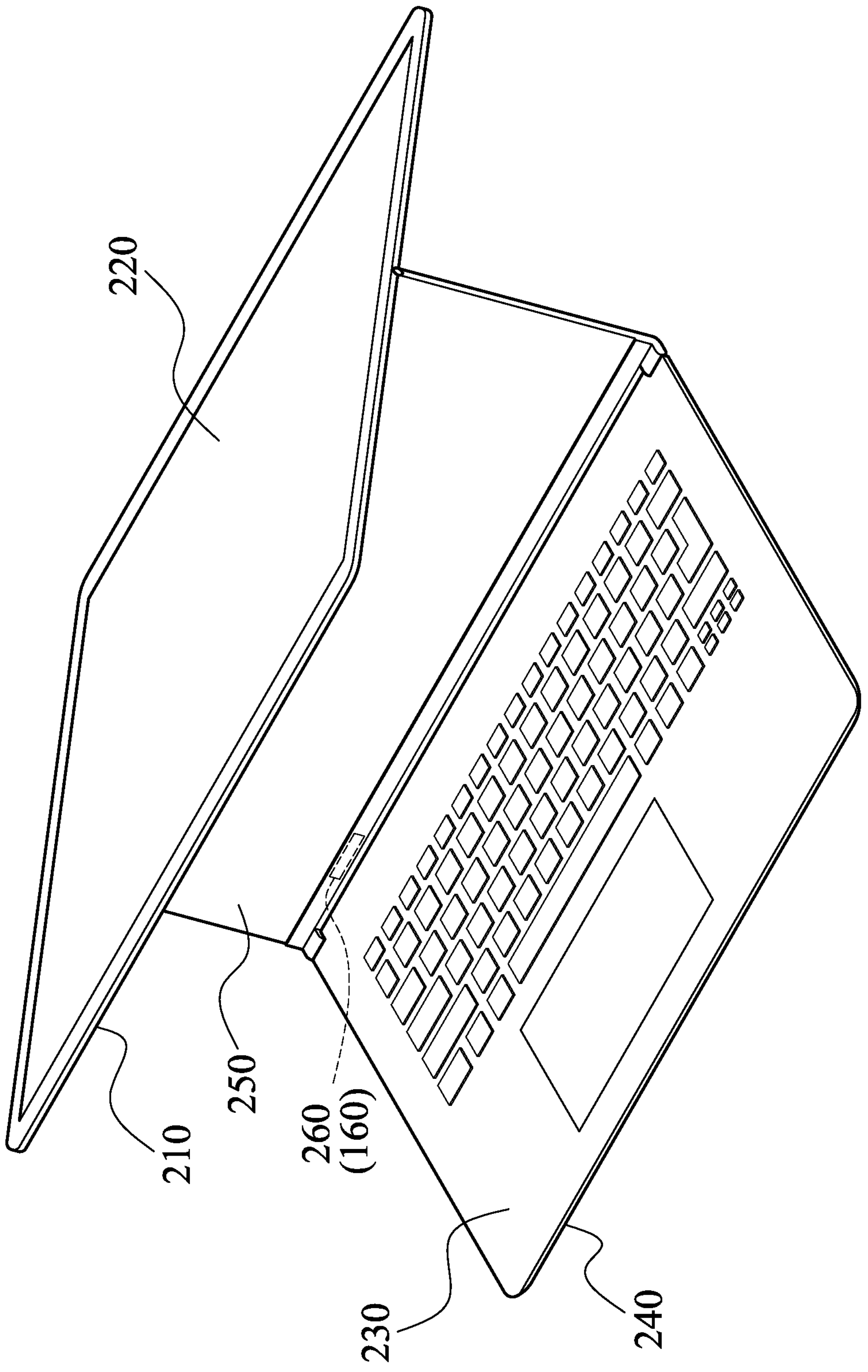
FIG. 2A is a perspective view of a convertible notebook computer operating in a display mode according to an embodiment of the invention.
Figure 2B:
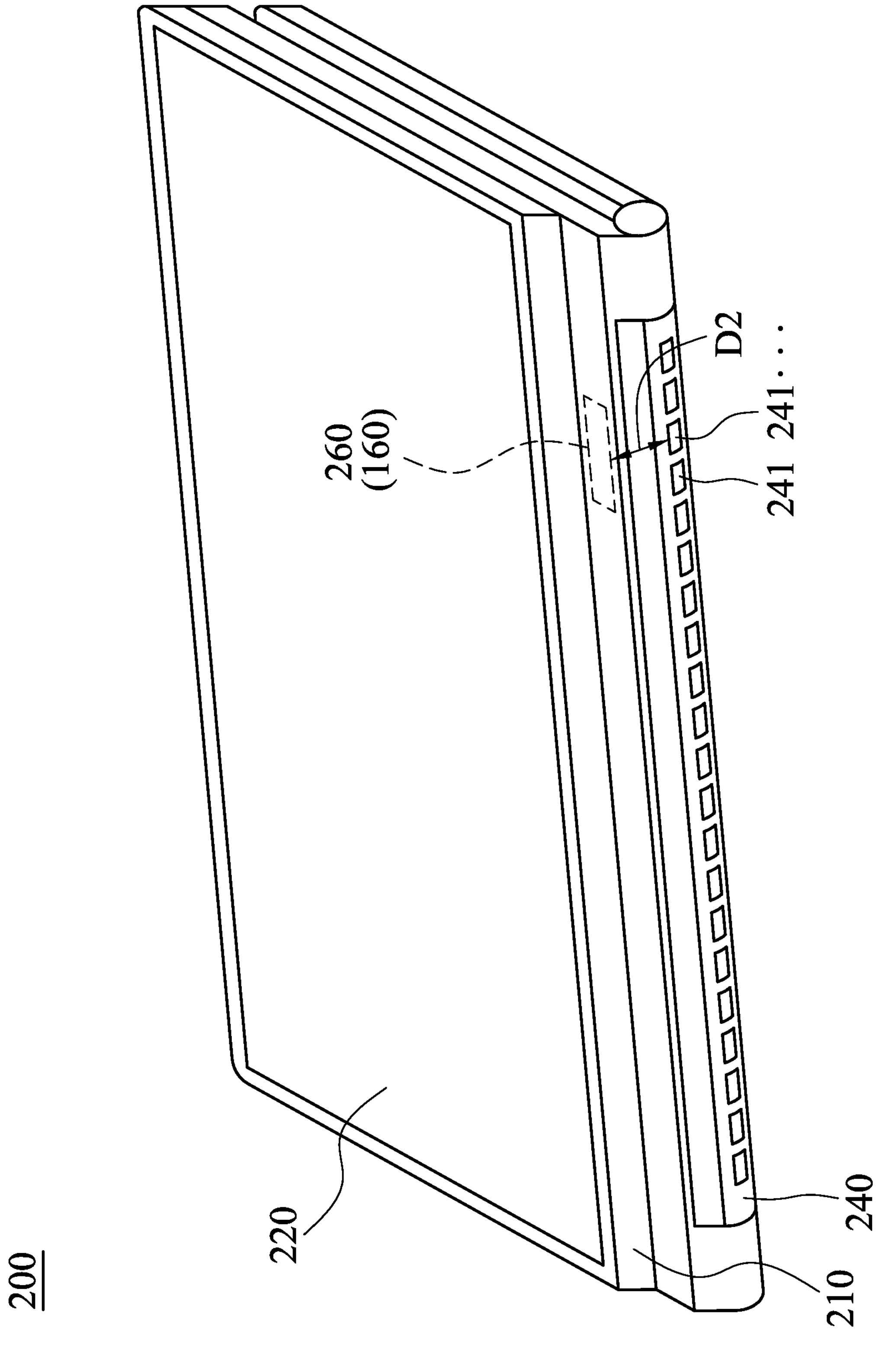
FIG. 2B is a perspective view of a convertible notebook computer operating in a tablet mode according to an embodiment of the invention.

FIG. 2A is a perspective view of a convertible notebook computer 200 operating in a display mode according to an embodiment of the invention. FIG. 2B is a perspective view of the convertible notebook computer 200 operating in a tablet mode according to an embodiment of the invention. In the embodiments of FIG. 2A and FIG. 2B, the convertible notebook computer 200 further includes an upper cover housing 210, a display frame 220, a keyboard frame 230, a base housing 240, and a supporting and rotating arm 250. The convertible notebook computer 200 can operate in different modes (e.g., more than three modes) by using the supporting and rotating arm 250. It should be understood that the upper cover housing 210, the display frame 220, the keyboard frame 230, and the base housing 240 are equivalent to the so-called "A-component", "B-component", "C-component" and "D-component" in the field of notebook computers, respectively, and they may be made of metal materials. The aforementioned antenna structure 160 may be positioned at a specific position 260 on the supporting and rotating arm 250. It should be understood that the supporting and rotating arm 250 may be also made of a metal material, and an antenna window corresponding to the antenna structure 160 may be opened on the supporting and rotating arm 250. Specifically, the base housing 240 has a plurality of heat vents 241. When the convertible notebook computer 200 operates in the tablet mode, the antenna structure 160 on the supporting and rotating arm 250 may be adjacent to the heat vents 241 of the base housing 240. For example, the distance D2 between the antenna structure 160 and the heat vents 241 of the base housing 240 may be longer than or equal to 2 mm. Using this design, the metal material in the base housing 240 will interfere with the radiation pattern of the antenna structure 160.

Figure 3:
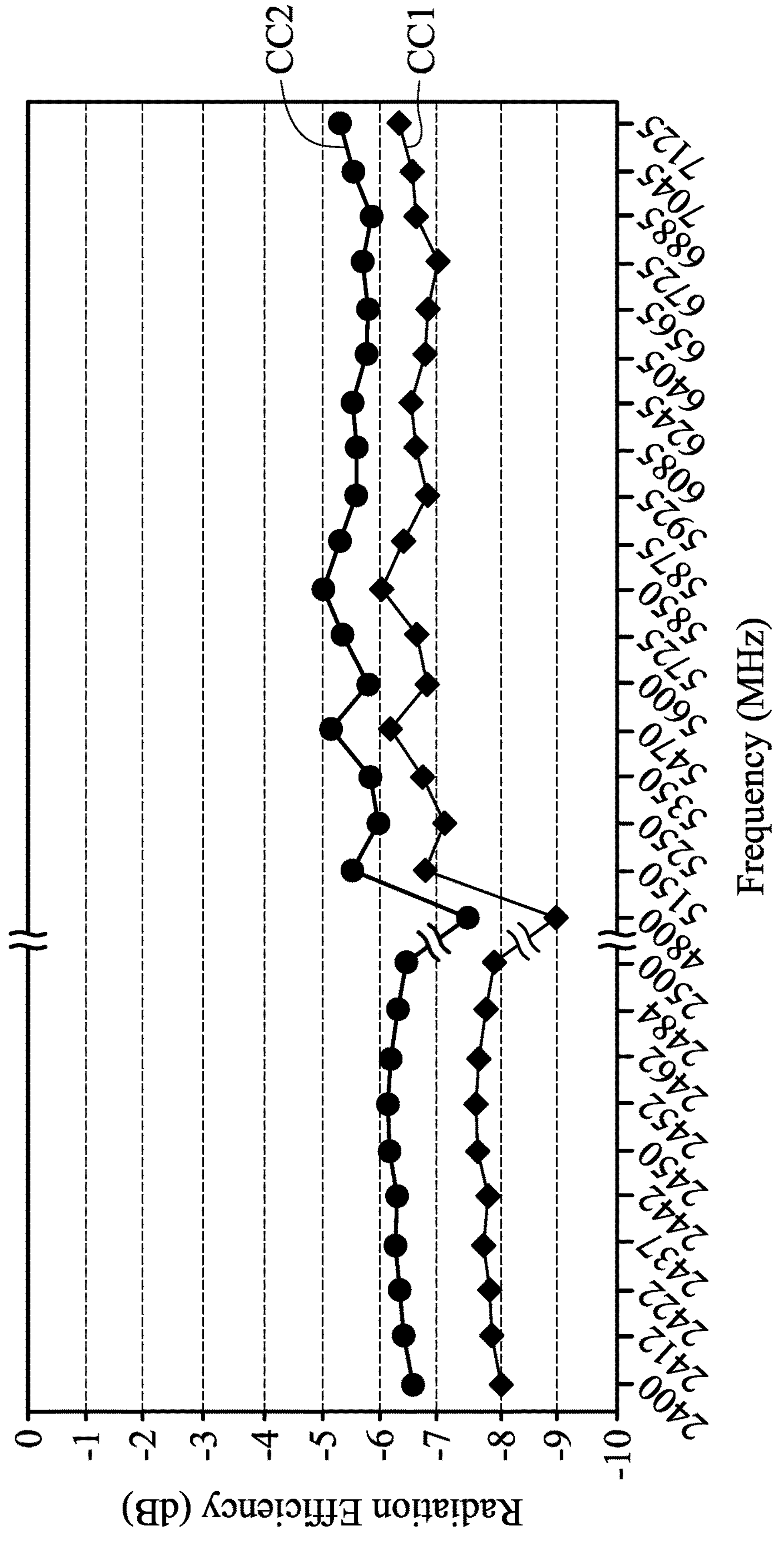
FIG. 3 is a diagram of radiation efficiency of a convertible notebook computer operating in a tablet mode according to an embodiment of the invention.

FIG. 3 is a diagram of radiation efficiency of the convertible notebook computer 200 operating in the tablet mode according to an embodiment of the invention. The horizontal axis represents the operational frequency (MHz), and the vertical axis represents the radiation efficiency (dB). As shown in FIG. 3, a first curve CC1 represents the operational characteristics of the antenna structure of the conventional convertible notebook computer, and a second curve CC2 represents the operational characteristics of the antenna structure 160 of the convertible notebook computer 200. According to the measurement of FIG. 3, even if the convertible notebook computer 200 operates in the tablet mode, the radiation efficiency of the antenna structure 160 can be increased by about 2 dB in comparison to the conventional design. Therefore, the proposed design of the invention can help to prevent the base housing 240 and its heat vents 241 from negatively affecting the radiation performance of the antenna structure 160, so as to enhance the whole communication quality of the convertible notebook computer 200.

The invention proposes a novel mobile device. According to practical measurements, the radiation performance of the antenna structure can be maintained within an acceptable range even if the mobile device operates in different modes. Compared to the conventional design, the invention has at least the advantages of small size, wide bandwidth, low manufacturing cost, high radiation efficiency, and good communication quality, and therefore it is suitable for application in a variety of mobile communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-3. The invention may merely include any one or more features of any one or more embodiments of FIGS. 1-3. In other words, not all of the features displayed in the figures should be implemented in the mobile device of the invention.

Use of ordinal terms such as "first". "second". "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device with high radiation efficiency, comprising:
- a ground element;
- a first radiation element, having a feeding point;
- a second radiation element, coupled to the first radiation element;
- a third radiation element, wherein the first radiation element is coupled through the third radiation element to the ground element;
- a fourth radiation element, coupled between the first radiation element and the third radiation element; and
- a dielectric substrate, wherein the first radiation element, the second radiation element, the third radiation element, and the fourth radiation element are disposed on the dielectric substrate;
- wherein an antenna structure is formed by the first radiation element, the second radiation element, the third radiation element, and the fourth radiation element;
- wherein the fourth radiation element directly touches both of the first radiation element and the third radiation element;
- wherein the mobile device is a convertible notebook computer comprising an upper cover housing, a display frame, a keyboard frame, a base housing, and a support and rotating arm;

wherein when the convertible notebook computer operates in a tablet mode, the antenna structure is adjacent to a plurality of heat vents of the base housing;

wherein a distance between the antenna structure and the heat vents of the base housing is longer than or equal to 2 mm.

2. The mobile device as claimed in claim 1, wherein a combination of the first radiation element and the third radiation element substantially has an inverted U-shape.

3. The mobile device as claimed in claim 1, wherein the second radiation element substantially has a straight-line shape.

4. The mobile device as claimed in claim 1, wherein the fourth radiation element substantially has a rectangular shape.

5. The mobile device as claimed in claim 1, wherein the antenna structure covers a first frequency band and a second frequency band.

6. The mobile device as claimed in claim 5, wherein the first frequency band is from 2400 MHz to 2500 MHz, and the second frequency band is from 5150 MHz to 5850 MHz.

7. The mobile device as claimed in claim 5, wherein a total length of the first radiation element and the second radiation element is substantially equal to 0.25 wavelength of the first frequency band.

8. The mobile device as claimed in claim 5, wherein a total length of the first radiation element and the second radiation element is substantially equal to 0.5 wavelength of the second frequency band.

9. The mobile device as claimed in claim 5, wherein a total length of the first radiation element and the third radiation element is substantially equal to 0.5 wavelength of the first frequency band.

10. The mobile device as claimed in claim 5, wherein a length of the fourth radiation element is substantially equal to 0.5 wavelength of the second frequency band.

11. The mobile device as claimed in claim 1, wherein a width of the fourth radiation element is from 6 mm to 8 mm.

12. The mobile device as claimed in claim 1, wherein the convertible notebook computer operates in different modes by using the support and rotating arm.

13. The mobile device as claimed in claim 1, wherein the antenna structure is disposed on the support and rotating arm.

* * * * *